United States Patent

[11] 3,591,791

| [72] | Inventor | Loebe Julie<br>New York, N.Y. |
|---|---|---|
| [21] | Appl. No. | 822,505 |
| [22] | Filed | May 7, 1969 |
| [45] | Patented | July 6, 1971 |
| [73] | Assignee | Julie Research Laboratories, Inc.<br>New York, N.Y. |

[54] PRECISION ANALOG COMPUTER FOR MULTIPLYING AND DIVIDING
5 Claims, 4 Drawing Figs.

| [52] | U.S. Cl. | 235/195,<br>235/196, 328/161, 235/194 |
|---|---|---|
| [51] | Int. Cl. | G06g 7/16 |
| [50] | Field of Search | 235/193,<br>194, 195, 196; 328/160, 161; 324/57, 62 |

[56] References Cited
UNITED STATES PATENTS

| 2,747,796 | 5/1956 | Patterson | 235/195 |
| 2,900,458 | 8/1959 | Rawdin | 235/196 UX |
| 2,924,386 | 2/1960 | Brook | 235/195 |
| 2,938,669 | 5/1960 | Henry | 235/196 X |
| 3,070,310 | 12/1962 | Poupitch | 235/196 X |

*Primary Examiner*—Malcolm A. Morrison
*Assistant Examiner*—Joseph F. Ruggiero
*Attorney*—Eliot S. Gerber

ABSTRACT: An analog computer, which divides or multiplies, utilizes a circuit module which may be a repeated unit. One form of the module includes an operational amplifier and a transfer ratio device. The transfer ratio device may be a linear voltage divider. One, or more, modules are used with a voltage dividing network and a null indicating device to form the analog computer.

PATENTED JUL 6 1971
3,591,791
INVENTOR
LOEBE JULIE
*Eliot S. Gerber*
ATTORNEY
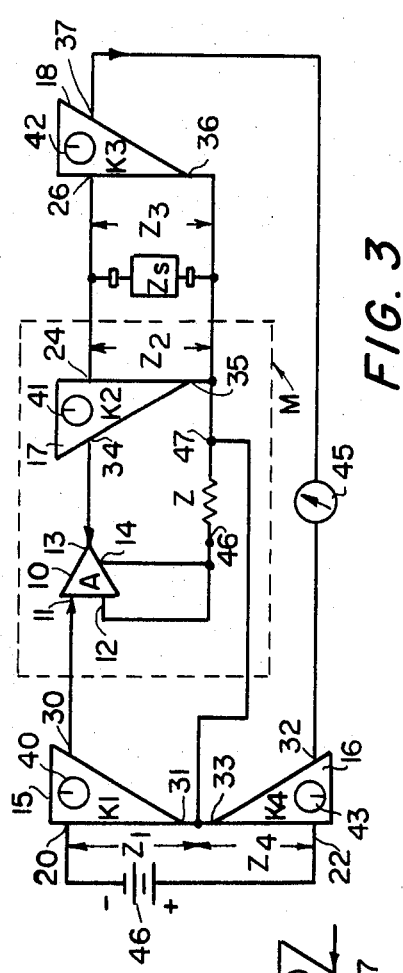
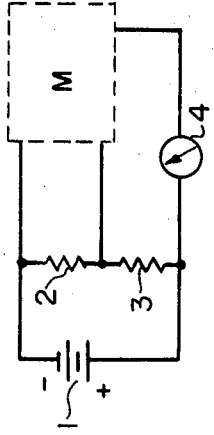
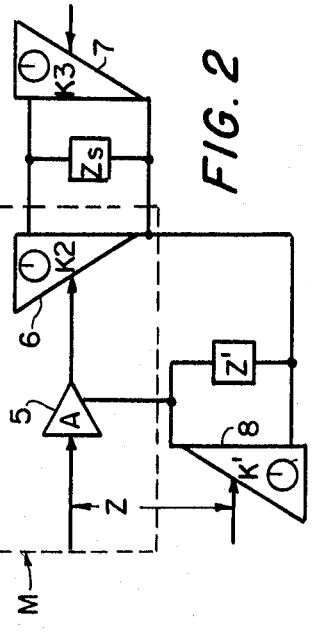
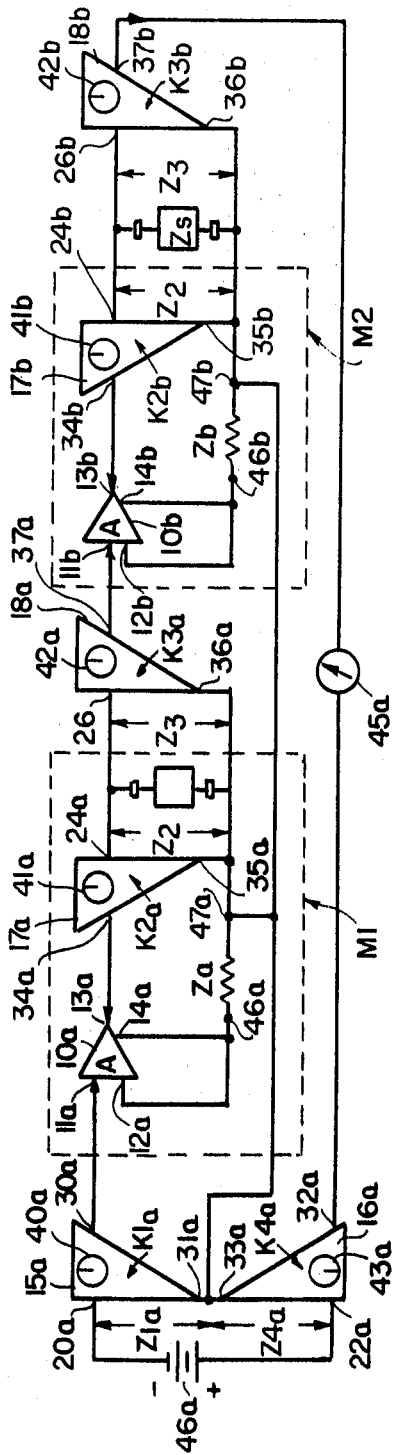

PRECISION ANALOG COMPUTER FOR MULTIPLYING AND DIVIDING

The present invention relates to analog computers.

An analog computer is an electronic device which simulates, by its electrical characteristics, a set of mathematical operations. For example, an analog computer may have as its inputs various transducers measuring pressure, temperature, etc. The computer represents (presents an analog) the transducers output by electrical parameters, performs mathematical operations such as division or multiplication and provides an electrical output representing the result of those operations.

An important consideration in analog computers is their accuracy. For example, if 19 units is to be subtracted from 20 units to obtain a 1 percent accuracy in their difference, of 1 unit, there must be a 0.5 percent accuracy in the representation of the 20 units. But it is different and costly to obtain accuracy in an analog computer. The accuracy of such a computer is limited by the accuracy of precision resistors and potentiometers; but even precision resistors are subject to aging, temperature variations and other effects which adversely affect their stability. The larger the number of components used, the greater is the possibility of inaccuracy.

It is the objective of the present invention to provide an analog computer which; (1) utilizes relatively few components, (2) is highly accurate and stable in its accuracy over time, and (3) provides a high degree of resolution.

Specifically, the present invention, compared to conventional analog computers, uses one-half the conventional number of operational amplifiers which they require to process an additional number of variables.

In accordance with the present invention, an analog computer is presented which multiplies and divides. The computer utilizes one or more modules, each module including an operational amplifier and one or more transfer ratio devices. The transfer ratio devices may be linear voltage dividers. The computer also includes a null indicating device, such as a meter, and a stable constant voltage supply. The accuracy of the system is limited only by the accuracy of the transfer ratio devices and is not adversely affected by changes in the electrical parameters of the other components.

The transfer ratio devices are selected to present an accurately predetermined impedance across two terminals and a varying impedance across two terminals, with one terminal in each pair possibly being common to the two pairs. Suitable transfer ratio devices are presently available which are accurate to one part in one million. The overall accuracy of the system, consequently, is a few parts in one million.

The transfer ratio devices are characterized, in part, by a series of transfer ratios, which enables the computer to manipulate data in terms of those transfer ratios.

Other objectives of the present invention will be apparent from the following description of an embodiment, being the best mode to practice the invention, taken in conjunction with the figures of the drawings. The drawings FIGS. 1—4 are schematic representations of the circuitry of the present invention.

As shown in FIG. 1, the analog computer of the present invention is based upon a module M, one or more of which may be used. The use of a single module, as shown in FIG. 3, allows solving for the type of equation $K1 \cdot K2 \cdot K3 = K4$ in which any one may be considered the unknown. The number of variables may be increased, for example, to $K1 \cdot K2 \cdot K3 \cdot K5 \cdot K6 = K4$, by the use of additional modules. The analog computer of FIG. 1, in addition to module M, also includes a power source 1, a voltage dividing network consisting of resistors 2 and 3, and a null detection device 4.

A suitable module M is shown in FIG. 2. The module includes an operational amplifier 5 and a first transfer ratio device 6, having transfer ratio $K2$. Its auxiliary circuit includes a second transfer ratio device 7 having transfer ratio $K3$, an impedance $Zs$, for scaling, a fixed impedance $Z'$, and a third transfer ratio device 8 having transfer ratio $K'$. The input impedance 2 is between amplifier 5 and transfer ratio device 8. The impedance $Zs$ is for scale, and may be a resistor which is removably connected in position. The auxiliary circuit, using transfer ratio devices 7 and 8, provides additional variables $K3$ and $K'$. The module itself only requires a single operational amplifier, means to provide a variable voltage to the amplifier, and a single transfer ratio device, such a module being able to compute one variable.

The balance equation for the entire circuit of FIG. 2 is $$Z = \frac{E_{in} \cdot K1 \cdot K2}{K' \cdot Z'}$$

The transfer ratio devices, such as 6, of the modules M and the transfer ratio devices of the auxiliary circuits are characterized by: (1) a predetermined impedance across two of its terminals, for example, of 100,000 ohms; (2) a linear adjusting means having a high resolution, such as a dial, to vary its transfer ratio; (3) a variable impedance depending upon the setting of the adjusting means, across its other two terminals. The adjusting means need not be linear but may be predetermined in some other fashion. A suitable form of transfer ratio device is a linear Kelvin-Varley voltage divider using precision resistors, as described in the applicant's U.S. Letters Pat. No. 3,179,880 at FIG. 7. Such a transfer ratio device may have a wide range of impedance and a resolution to eight places. K is the transfer ratio determined by the setting of the transfer ratio device. The flow of current in relationship to the terminals is indicated by the arrows. Each of the transfer ratio devices has two terminals presenting a predetermined impedance and two terminals across which the impedance may be varied by the operator.

In the circuit of FIG. 3, an operational amplifier 10 has two input terminals 11 and 12 and two output terminals 14 and 13, with terminals 12 and 14 being connected together.

The circuit of FIG. 3 employs four transfer ratio devices 15 (K1), 16 (K2), 17 (K3) and 18 (K4). Preferably the transfer ratio devices are linear voltage dividers. In transfer ratio devices 15, 16, 17 and 18 the predetermined impedance terminals are terminals 20 and 31; 22 and 33; 24 and 35; and 26 and 36.

The terminals across which the impedance may be varied in transfer ratio devices 15, 16, 17 and 18 are, respectively, 30 and 31; 32 and 33; 34 and 35; and 36 and 37. The transfer ratio devices 15, 16, 17 and 18 have impedance varying means, such as dials, by which the impedance across the variable terminals may be changed, the dials being, respectively, 40, 41, 42 and 43.

The circuit also includes a null indicating device (detector) 45, such as a voltage meter, and a sensing resistor Z having terminals 46 and 47, and a voltage source 46, such as a battery, having terminals connected to the terminals 20 and 22.

The common terminals of the transfer ratio devices are connected together with terminal 35 connected to 36 and 31 and 33. The following terminal connections connect the operational amplifier to transfer ratio devices 15, 17 and impedance Z respectively: 30 to 11, 13 to 34 and 14 to 46. The predetermined impedance terminals of ratio devices 17 and 18 are connected, respectively, to terminals 24 to 26 and 35 to 36. The variable terminal 37 is connected to one input of null device 45 and variable terminal 32 to its other input.

For the purposes of aiding in explaining the following formulas, the terminals across which the impedance is predetermined, i.e., fixed, at least for the duration of any particular operation, are called the "input" and the impedance across them designed $Z_{in}$. For example, $Z_{in}1$ means the impedance across the "input" terminals 20 and 31 of transfer ratio device 15. The transfer ratios K of devices 15, 16, 17 and 18 are designated K1, K2, K3 and K4, respectively.

I. Assume $Z_{in}1 = Z_{in}4$

II. Then, at the balance (null indicator 45 indicating a null)

$$Z = \frac{(Z_{in}3)(Z_{in}2)}{(Z_{in}3) + (Z_{in}2)} \text{ or } Z = \frac{K_4}{K1 \cdot K2 \cdot K3(Z_{in}3)//(Z_{in}2)}$$

For example, to perform a computation $Z$ (the impedance of $Z$) is made equal to $(Z_{in}2)$ // $(Z_{in}3)$ which // indicates the connection of terminals 24 to 26 and 35 to 36 making $(Z_{in}2)=(Z_{in}3)$.

III. Then $K1 \cdot K2 \cdot K3 = K4$. Any one of these may be considered unknown. For example, one may multiply $K1 \cdot K2 \cdot K3$ to provide $K4$ or divide to provide the unknown $K3 = K4/(K1 \cdot K2)$.

IV. If $(Z_{in}1) \neq (Z_{in}4)$

V $$\frac{V(Z_{in}1)}{(Z_{in}1)+(Z_{in}4)} \cdot K1 \cdot \frac{1}{Z}(Z_{in}2)//Z_{in}3 \cdot K2 \cdot K3 = \frac{V(Z_{in}4)}{(Z_{in}1)+(Z_{in}4) \cdot K4}$$

VI $$(Z_{in}1) \cdot K1 \cdot \frac{1}{Z}(Z_{in}2)//(Z_{in}3) \cdot K2 \cdot K3 = (Z_{in}4) \cdot K4$$

$$\frac{K1 \cdot K2 \cdot K3}{K4} = \frac{(Z_{in}4) \cdot Z}{(Z_{in}1)(Z_{in}2)//(Z_{in}3)}$$

In the embodiment of FIG. 4, the use of two modules is shown. Each module M1 and M2 has an operational amplifier 10a and 10b and a transfer ratio device 17a and 17b. The auxiliary circuit for each module includes a scaling impedance $Z_s$ and a second transfer ratio device 18a and 18b. The second transfer ratio device adds to each module the ability to compute a second variable. In the circuit of FIG. 4, the variables are K1, K2a, K3a, K2b, K3b and K4a.

I claim:

1. An analog computer including a voltage source; a null indicating device and a voltage dividing network; an operational amplifier, a transfer ratio device and a fixed impedance, the transfer ratio device being characterized by a constant impedance across two of its terminals and an impedance which may be varied across two of its terminals, and an impedance varying means to change said variable impedance; wherein the voltage source is connected to the terminals of the voltage dividing network, the null indicating device is connected directly or indirectly to measure the output from the transfer ratio device, the output of said operational amplifier is connected to the variable impedance terminal of the transfer ratio device, the fixed impedance is connected between the output of the operational amplifier and the transfer ratio device, and a varying voltage means representative of a quantity to be computed is connected to the input of the amplifier.

2. An analog computer as in claim 1 wherein the varying voltage means is a transfer ratio device being characterized by a constant impedance across two of its terminals, and an impedance varying means to change said variable impedance.

3. An analog computer as in claim 1 and also including a second transfer ratio device being characterized by a constant impedance across two of its terminals and an impedance which may be varied across two of its terminals, and an impedance varying means to change said variable impedance, the constant impedance terminals of said first and second transfer ratio devices being connected together.

4. An analog computer comprising a voltage source; a null indicating device; a voltage dividing network having a center tap; a fixed impedance; an operational amplifier; and two transfer ratio devices, each of the transfer ratio devices being characterized by a constant impedance across two of its terminals and an impedance which may be varied across two of its terminals, and an impedance varying means to change said variable impedance; wherein the output of said operational amplifier is connected to a variable impedance terminal of the first transfer ratio device, the constant impedance terminals of the first and second transfer ratio devices are connected together, and the fixed impedance is connected between the output of the operational amplifier and the second transfer ratio device, the null indicating device is connected to a variable impedance terminal of the voltage dividing network, and the voltage source is connected to the terminals of the voltage dividing network.

5. An analog computer comprising a voltage source; a null indicating device; a fixed impedance; an operational amplifier; and four transfer ratio devices, each of the transfer ratio devices being characterized by a constant impedance across two of its terminals and an impedance which may be varied across two of its terminals, and an impedance means to change said variable impedance; wherein said operational amplifier is connected between the variable impedance terminals of the first and second transfer ratio devices, the constant impedance terminals of the second and third transfer ratio devices are connected together, and the fixed impedance is connected between the output of the operational amplifier and the second transfer ratio device, the null indicating device is connected between the third and fourth transfer ratio devices, and the voltage source is connected between the first and fourth transfer ratio devices.